United States Patent
Hauser et al.

(10) Patent No.: US 7,263,100 B2
(45) Date of Patent: Aug. 28, 2007

(54) CAPACITY ALLOCATION FOR FAST PATH RESTORATION

(75) Inventors: Oded Hauser, Matawan, NJ (US); Muralidharan S. Kodialam, Marlboro, NJ (US); Tirunell V. Lakshman, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1124 days.

(21) Appl. No.: 10/357,559

(22) Filed: Feb. 4, 2003

(65) Prior Publication Data

US 2004/0151124 A1    Aug. 5, 2004

Related U.S. Application Data

(60) Provisional application No. 60/387,534, filed on Jun. 10, 2002.

(51) Int. Cl.
*H04L 12/28* (2006.01)
*H04L 12/56* (2006.01)

(52) U.S. Cl. .................. 370/395.41; 370/230; 370/231; 370/232; 370/235; 370/238; 370/395.21; 709/223; 709/226; 709/229; 709/241; 709/239

(58) Field of Classification Search ..................... None
See application file for complete search history.

(56) References Cited

U.S. PATENT DOCUMENTS 6,498,778 B1 * 12/2002 Cwilich et al. ............. 370/216
6,909,700 B1 * 6/2005 Benmohamed et al. ..... 370/255
7,145,867 B2 * 12/2006 Aicklen et al. ............. 370/228

OTHER PUBLICATIONS

"Faster and Simpler Algorithms for Multicommodity Flow and other Fractional Packing Problems" by Naveen Garg and Jochen Kömann, pp. 1-10.
"A Simple Efficient Approximation Scheme for the Restricted Shortest Path Problem" by Dean H. Lorenz and Danny Raz, pp. 1-10.

* cited by examiner

*Primary Examiner*—Raj K. Jain

(57) ABSTRACT

Capacity design of an optical network for demands of fast path restorable (FPR) connections forms a linear programming sizing problem for a optimal routing. A dual of the linear programming sizing problem is formed and solved with an approximation algorithm. Edge lengths are initialized based on i) the inverse of the edge's capacity and ii) a scalar constant. Then, the approximation algorithm proceeds in phases to route each commodity over the edges of a graph. During each phase, the demand's flow is sent from the source to destination via multiple iterations. During each iteration, the set of shortest disjoint paths from the source to the destination is determined, a portion of the flow is sent, and the lengths of the edges that carry the flow are updated. The value employed to scale the network is generated after the last phase from the maximum ratio of edge flow to edge capacity.

18 Claims, 4 Drawing Sheets

CAPACITY ALLOCATION FOR FAST PATH RESTORATION

CROSS-REFERENCE TO RELATED APPLICATIONS

This application claims the benefit of the filing date of U.S. provisional application No. 60/387,534, filed on Jun. 10, 2002.

This application is related to U.S. patent application filed on Feb. 4, 2003 as Ser. No. 10/357,557, the teachings of which are incorporated herein by reference.

BACKGROUND OF THE INVENTION

1. Field of the Invention

The present invention relates to routing connections in a telecommunications network, and, more particularly, to capacity allocation for paths through nodes of the network for path restoration.

2. Description of the Related Art

In interconnected optical communications networks, a user establishes a connection between a source node and a destination node with a stream of data that is transferred through the network over a network path. Optical networks are typically characterized by a set of micro-mechanical optical switches (nodes) connected via optical links. A network path for a connection between a given source-destination (node) pair is defined by a set of nodes (the source and destination node pair and any intermediate nodes) interconnected by a set of links coupled to the nodes carrying the data stream, or flow, of the connection.

Service restoration is an important requirement of optical networks. If a network element fails, such as a node (optical switch) or link (optical fiber), the failure causes one or more particular wavelength paths to fail, and affected traffic flow(s) must be restored using an alternate path within a very short interval (e.g., 50 ms). To accomplish relatively rapid restoration times, provisioning identifies, for each wavelength path, two paths through the network: a primary (active) path and a secondary (backup) path. The backup path is link disjoint (active and backup paths do not share links) or node disjoint (active and backup paths do not share either nodes or links) with the primary path. The capacity of links in the backup path assigned to a corresponding primary path (e.g., wavelength), or, for network bandwidth usage efficiency, the capacity may be shared between links of backup paths for different primary paths, depending on the type of restoration desired. Optical network capacity design typically accounts for restoration needs to route disjoint secondary paths with possible sharing.

A connection may be considered a fast path restorable (FPR) connection if the backup path switching configurations are fixed at the time of setting-up the connection in the active path and no reconfiguration is required after a failure in the active path. FPR connections are of two types: FPR connections with no shared backup (NSB FPR connections) and FPR connections with shared backup (SB FPR connections).

NSB FPR connections have two link disjoint paths reserved for the connection, where no capacity of links in the backup path is shared with other backup paths. Two methods for restoration may be employed for NSB FPR connections. In the first method, one disjoint path is the active path with all traffic switched to the other disjoint path upon an active path failure. In the second method, the source transmits the same traffic on both disjoint paths, and the destination picks the path from which to receive the traffic based on some metric, such as signal-to-noise ratio (SNR) or bit error rate, for the signal received from each path. Both methods of restoration for NSB FPR connections, however, exhibit relatively poor bandwidth usage efficiency from the overall network capacity standpoint.

Figure 1:
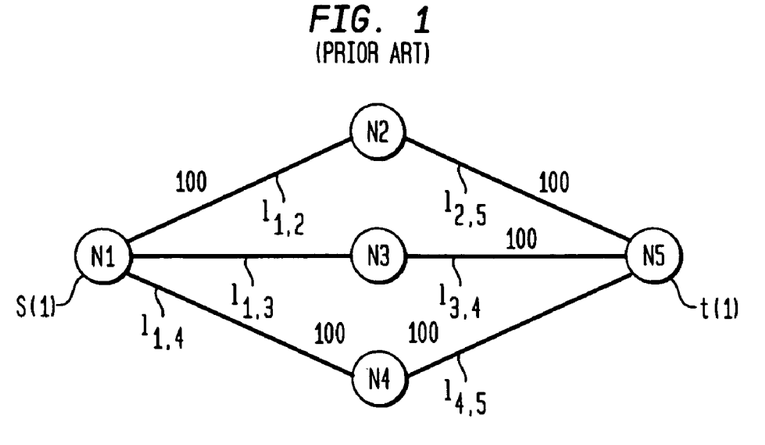
FIG. 1 shows a prior art network of nodes connected by links for fast path restorable (FPR) connections.

SB FPR connections, while exhibiting increased bandwidth usage efficiency, are subject to certain constraints to be feasible. First, active paths between the same source-destination pairs may share backup path bandwidth (i.e., may share capacity of backup path links). Second, if two active paths share backup paths, then the backup paths are shared end-to-end. To illustrate aspects of sharing in FPR connections, FIG. 1 shows a network 100 of nodes N1-N5 connected by links $l_{ij}$, i,j integers and $1 \leq i,j \leq 5$. As shown in FIG. 1, each link $l_{ij}$ has a capacity of 100 units of bandwidth. A connection between source s(1) and destination t(1) may be established with a desired demand (bandwidth capacity requirement) of 200 units. If no restoration is required, the network may route up to 300 units of demand in the active path. The active path is defined as 100 units over the path defined by N1-N2-N5, 100 units over the path defined by units N1-N3-N5, and 100 units defined over the path defined by N1-N4-N5.

Figure 2:
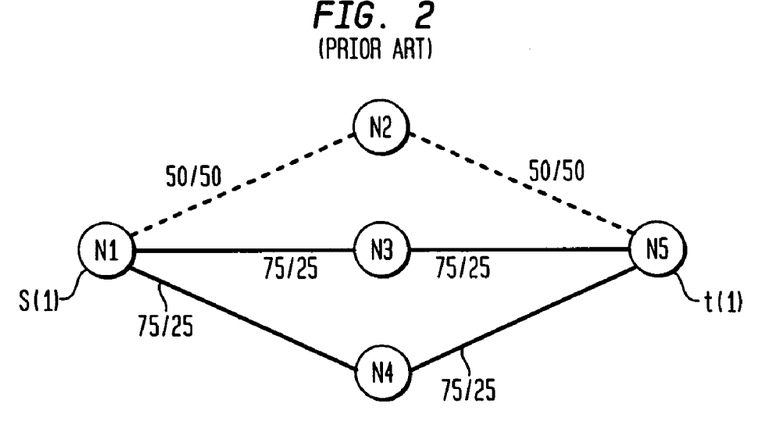
FIG. 2 illustrates the network of FIG. 1 supporting demand of an FPR connection with no capacity sharing in the backup path.

If the connection is established as a NSB FPR connection, the maximum amount of capacity (packet or data flow) that may be accommodated by network 100 is 150 units. FIG. 2 illustrates the network of FIG. 1 with an exemplary NSB FPR connection accommodating 150 units of demand with no capacity sharing in the backup path. In the figures, the dashed line indicates the backup path and the solid line indicates the active path. As shown in FIG. 2, for example, 75 units of demand is routed through a first path defined by N1-N3-N5, and 75 units of demand is routed through a second path defined by N1-N4-N5. The backup path for the first path is a) 50 units of demand reserved on the path defined by N1-N2-N3 and b) 25 units of demand reserved on the path N1-N4-N5. Similarly, the backup path for the second path is a) the remaining 50 units of demand reserved on the path defined by N1-N2-N3 and b) 25 units of demand reserved on the path N1-N3-N5.

Figure 3:
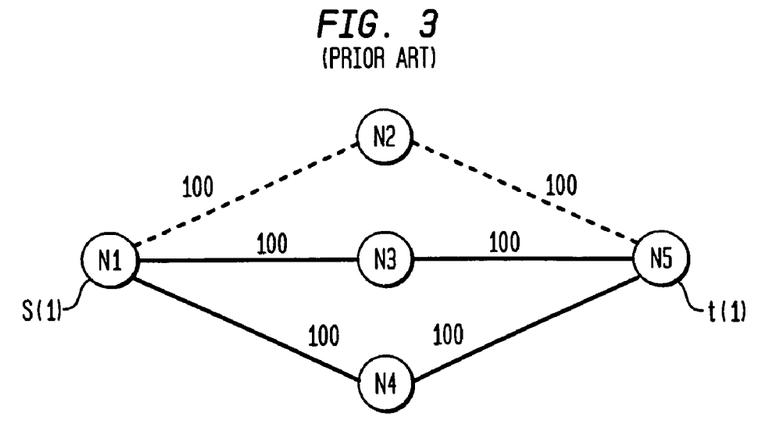
FIG. 3 illustrates the network of FIG. 1 supporting demand of an FPR connection with capacity sharing in the backup path.

However, if the connection is established as a SB FPR connection, network 100 may accommodate 200 units of demand. For example, the active path may be defined as 100 units over the path defined by N1-N3-N5 and 100 units over the path defined by units N1-N4-N5. The backup path is defined as 100 units over the path defined by N1-N2-N5. Thus, the 100 units of capacity of the path N1-N2-N5 is completely shared by the paths N1-N3-N5 and N1-N4-N5. Such SB FPR connection is shown in FIG. 3.

SUMMARY OF THE INVENTION

In accordance with embodiments of the present invention, capacity design of an optical network for fast path restorable (FPR) connections solves a linear programming sizing problem for optimal routing of demands associated with the FPR connections. The optical network is modeled as a graph of edges and vertices corresponding to the links and nodes of the optical network. A dual of the linear programming sizing problem may be formed, and may be solved using an approximation algorithm. First, edge lengths are initialized to a small number based on i) the inverse of the edge's capacity and ii) a scalar constant. Then, the approximation algorithm proceeds in phases. In each phase, the demand for each commodity is routed over the edges of the graph. During each phase, the demand's flow is sent from the source to the destination via multiple iterations. During each iteration, the set of shortest disjoint paths from the source to the destination is determined. The actual amount of flow sent is the lesser of the capacity of the minimum capacity edge and the remaining amount of flow to make up the demand of the current phase. Once the actual amount of flow is sent over the set of shortest disjoint paths for the iteration, the lengths of the edges that carry the flow are updated, where the link's length is a weight or cost associated with the link. The last iteration ends when the entire flow of the demand is routed. After the last phase, the value employed to scale the network demands or link capacity is generated from the maximum ratio of edge flow to edge capacity.

In accordance with some embodiments of the present invention, demands of a plurality of restorable connections transferring data through a network of nodes connected by links are allocated. Allocation of the demands initializes a link length of each link. Allocation then routes, for each restorable connection, a demand for a current restorable connection by: (1) generating a minimum path length for paths through nodes and links of the network for the current restorable connection, wherein the shortest path length is the least sum of link lengths for links of each path between a source and a destination node of the current restorable connection, (2) determining a path set of disjoint paths through nodes and links of the network for the current restorable connection based on the shortest path length, (3) routing a portion of a remainder of the demand as flows over the path set, wherein the portion is based on a lesser value of the remainder of the demand and a minimum capacity of links in the optimal path set, (4) updating i) the link length of each link based on the routed portion and a capacity of the link and ii) the remainder of the demand, and (5) repeating (1)-(5) until the demand is routed. A scaling value is then generated based on a maximum ratio of a flow over a link and a capacity of the link.

In accordance with some embodiments of the present invention, link capacity for a plurality of restorable connections transferring data through a network is allocated by generating a graph of the network, wherein the network includes a plurality of nodes interconnected by a plurality of links, and forming a linear programming sizing problem based on the plurality of restorable connections, wherein i) each restorable connection defines a primary and a backup path for a demand and ii) the linear programming sizing problem tends to maximize a first objective function based on a first set of constraints. A dual of the linear programming sizing problem is then formed, wherein the dual tends to maximize a second objective function based on a second set of constraints; and the dual is solved to generate a scaling factor and routing of the primary path and the backup path for each of the plurality of restorable connections.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The following definitions may aide in an understanding of the present invention. An optical network of nodes and links may be modeled as a directed graph G(V,E), where V is a set of vertices representing the nodes of the network (e.g., optical switches) and E is a set of edges representing the (e.g., optical) links connecting the nodes. One or more fast path restorable (FPR) connections are routed between K source-destination node pairs, where each of the source-destination node pairs along with its demand is termed a "commodity." The terms s(k) and t(k) denote the source node and destination node for the kth commodity, respectively, and the term d(k) denotes the corresponding demand for the kth commodity. Thus, for the kth commodity, d(k) units of flow are to be routed between s(k) and t(k) The set $P_j^k$ is the set of j disjoint paths between s(k) and t(k). A path set P∈$P_j^k$ ("∈" is the mathematical term "is an element of") if P comprises j edge disjoint paths between the nodes s(k) and t(k). The value of $b_k$ is the maximum number of disjoint paths between the nodes s(k) and t(k), and the value of B is the maximum value of $b_k$ over all k commodities. The set $P_j^k$ is defined for all j≦B, and, if $b_k$<B for a given commodity k, then the set of paths in $P_j^k$ for all j>$b_k$ is empty.

Capacity design in accordance with embodiments of the present invention seeks an optimal routing for FPR connections over a network. Embodiments of the present invention may scale capacity of network links for, or scale demands of, FPR connections routed over the network. A connection is an FPR connection if the backup path switching configurations are fixed at the time of setting-up the connection in the active path and no reconfiguration is required after a failure in the active path occurs. Embodiments of the present invention may apply to FPR connections of two types: FPR connections with no shared backup (NSB FPR connections) and FPR connections with shared backup (SB FPR connections).

While embodiments of the present invention are described herein for optical networks of optical switches connected by optical links, the present invention is not so limited. The present invention may be extended to any communications network, such as MPLS or similar packet networks, that may route restorable connections over a network of nodes and links between source-destination pairs. In addition, the present invention is not limited to optical networks, but may also be employed with electrical or electrical/optical hybrid networks.

For a first exemplary embodiment of the present invention, for the case of NSB FPR connections, the method of capacity design routes each connection on two edge disjoint paths. The method of capacity design forms a sizing problem that is a generalization of a maximum concurrent flow problem for non-restorable flows. Thus, j=2 and $P_2^k$ represents the set of edge disjoint path pairs between s(k) and d(k). If P∈$P_2^k$ then P is a path pair of edge disjoint paths between s(k) and d(k), and x(P) represents the flow sent on path pair P (i.e., a flow of x(P) is sent on each edge in the path pair P). The sizing problem is formulated as a maximization of an objective function λ subject to the constraints of equations (1), (2), and (3) as follows:

λ*=max λ subject to:

$$\sum_{k} \sum_{P \in P_2^k; e \in P} x(P) \leq u(e) \quad \forall \, e \in E, \tag{1}$$

$$\sum_{P \in P_2^k} x(P) = \lambda d(k) \; \forall \, k, \text{ and} \tag{2}$$

$$x(P) \geq 0 \, \forall P \in P_j^k, \forall j, \forall k \tag{3}$$

where "max" is the mathematical term for "maximize" the objective function "λ". The constraint of equation (1) sums all flows sent on a given edge e, and this sum has to be less than the capacity u(e) of the link. The constraint of equation (2) ensures that a flow of λd(k) is sent for commodity k, where λ is a scalar that the objective function seeks to maximize. The constraint of equation (3) ensures that the flows over the edges are positive.

If λ* represents the maximum value of λ and if λ*≧1, then the given demands d(k) may be routed on the network and the routing may be determined through the solution of the above sizing problem. If the value of λ*<1, then all the current demands d(k) may not necessarily be routed on the network. However, if the value of λ*<1, the demands might be scaled by λ* (since λ*<1, the demands d(k) are scaled down) and new demands may be accommodated in the network. Alternatively, the capacity of all links in the network might be scaled by (1/λ*) (i.e., the capacity of the network's links is increased). The given demands d(k) may then be routed on this larger capacity network.

The linear programming problem given above includes an exponential number of variables since there are potentially an exponential number of path pairs in the network for each commodity. Therefore, preferred embodiments of the present invention employ a primal dual approach to form an indirect solution for the above linear programming problem The dual to the linear programming sizing problem above is as follows. The dual sizing problem assigns a length l(e) to each edge e of the graph G(V,E). The length l(P) of a path pair P∈P₂ᵏ is defined as the sum of the lengths of the edges of the path pair P. A dual sizing problem variable z(k) (the dual of the objective function λ) is associated with commodity k. The variable z(k) is the shortest path length between s(k) and t(k) (i.e., the shortest path length is the length of the path(s) whose sum of edge (link) lengths has the least value). The dual sizing problem is formulated as a minimization of z(k) subject to the constraints of equations (4), (5), and (6) as follows:

$$\min \sum_{e \in K} u(e) l(e)$$

subject to:

$$\sum_{e \in P} l(e) \geq z(k) \quad \forall \, P \in P_2^k \quad \forall \, k \tag{4}$$

$$\sum_{k=1}^{K} d(k) z(k) \geq 1 \tag{5}$$

$$l(e) \geq 0 \, \forall e \in E \tag{6}$$

where equation (4) ensures that z(k) is the minimum path length, equation (5) ensures that all demands are routed, and equation (6) ensures that all edge lengths are non-negative.

Solution of the dual sizing problem for NSB FPR connections might employ an ϵ-approximation algorithm. A ϵ-approximation algorithm may be employed to generate an approximate solution to the dual (e.g., to within approximately (1+2ϵ) of the optimal solution). A discussion of ϵ-approximation algorithms may be found in Garg and Konemann, "Faster and Simpler Algorithms for Multicommodity Flow and Other Fractional Packing Problems," which is incorporated herein in its entirety by reference.

A summary of the operation of the approximation algorithm is as follows. First, the edge lengths l(e) are initialized to a small number based on i) the inverse of the edge's capacity and ii) a scalar constant. Then, the approximation algorithm proceeds in phases. In each phase, for each commodity k, d(k) units of flow are routed from s(k) to t(k) over the edges of the graph G(V,E). A phase ends when the last commodity K is routed. During each phase, the d(k) units of flow from s(k) to t(k) for commodity k are sent from s(k) to t(k) via multiple iterations. During each iteration, the shortest pair of disjoint paths from s(k) to t(k) is determined. The variable u represents the minimum capacity edge on this shortest pair of disjoint paths from s(k) to t(k) (u also represents the amount of capacity of the minimum capacity edge), and at most u units may be sent during an iteration. Since d(k) units of flow are desirably sent for commodity k in each phase, the actual amount of flow sent during an iteration is the lesser of u and the remaining amount of flow to make up d(k) of the current phase. Once the actual amount of flow is sent for the iteration, the lengths of the edges that carry the flow are increased based on ϵ and the actual amount of flow routed over the edges. For an ϵ-approximation algorithm, the value of ϵ is generally selected as a relatively small number related to the ratio of the solutions to the primal and dual programming problems. The last iteration ends when the d(k) units of flow are routed.

Therefore, the ϵ-approximation algorithm alternates between sending flow along shortest path pairs and adjusting the lengths of the links along which the flow has been sent for each phase, and repeats the process until the (ϵ-approximate) optimal solution is reached. The ϵ-approximate optimal solution has a value at least (1−ϵ) time the optimal solution. Consequently, ϵ may be arbitrarily selected as a relatively small number. Increasing the number of phases increases the "closeness" of the ϵ-approximation (i.e, the near optimal solution) to the (mathematically) optimal solution. If D(w)=Σ_{e∈E}l(e)u(e), then the algorithm may terminate at the end of the phase when the value of D(w)>1. Since l(e) is updated based on ϵ, decreasing ϵ implies more phases are required to make D(w)>1.

Figure 4:
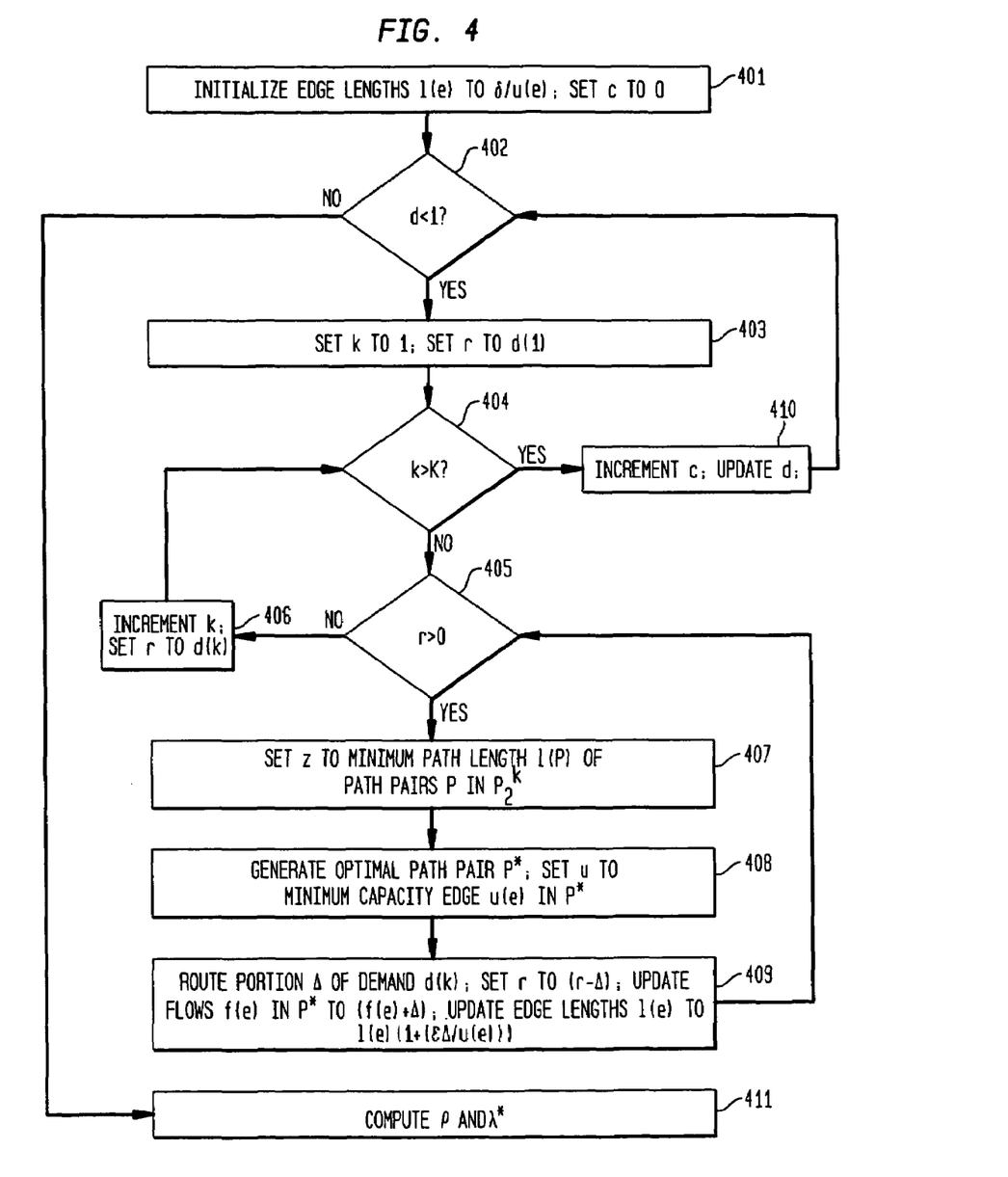
FIG. 4 shows an exemplary method of solving a dual sizing problem for non-shared backup FPR connections employing an approximation algorithm.

FIG. 4 shows an exemplary method of solving the dual sizing problem for NSB FPR connections employing an approximation algorithm. At step 401, an associated length l(e) of each edge e is initialized with an initial weight of $$\frac{\delta}{u(e)}.$$

The value of δ is related to ε, as described subsequently, and u(e) is the total available capacity (not residual capacity) of edge e. Also, at step 401, the counter value c is set to 0. As the method progresses, c is updated to count the number of phases completed by the method.

At step 402, a test determines whether d is less than 1, where d is $D(w)=\Sigma_{e\in E}l(e)u(e)$. The variable d is set and the test of step 402 determines whether, after the previous phase has completed, the current solution of the ε-approximation meets a predefined criterion for a near optimal solution to the dual sizing problem. If the test of step 402 determines that d>1, the method advances to step 411, where the process of computing final output values begins. If the test of step 402 determines that d≦1, then another phase (c+1) is desired and the method advances to step 403.

At step 403, the value of k is set to 1, and flow variable r is set to the first commodity's demand d(1). At step 404, the method checks whether k>K, indicating that all K commodities have been routed for the current pass (c). If the test of step 404 determines that k>K, then the method advances to step 410. At step 410, the counter value c is incremented by 1, d is updated, and the method returns to step 402. If the test of step 404 determines that k<K, the method advances to step 405.

At step 405, a test determines whether r>0. If the test of step 405 determines that r is less than or equal to 0, then the current demand d(k) has been routed, and the method advances to step 406. At step 406, k is incremented by 1 to point to the next commodity, r is set to next commodity's demand, and the method returns to step 404 to route the next commodity's demand. If the test of step 405 determines that r>0, then not all of the current commodity's demand has been routed, and the method advances to step 407.

At step 407, the minimum length variable z is set to the minimum path length l(P) of the path pairs P in $P_2^k$, where the path length l(P) is defined as the sum of the lengths of the edges in the path pair P. At step 408, the optimal path pair P* is generated for this length z, such as by the method described below with respect to FIG. 5, and the minimum capacity edge variable u is set as the capacity of the edge in P* having the least value (i.e., min u(e), where e∈P*).

At step 409, a portion Δ of the demand d(k) is routed. The portion Δ of demand is set as the minimum value between r and u. The variable r is updated to (r−Δ), the flows on the edges in P* that carry the flows are updated (i.e., f(e) gets f(e)+Δ), and the lengths of the edges that carry the flow are updated. In step 409, the ε-approximation updates the lengths l(e), e∈P*, as l(e)(1+(εΔ/u(e)). Thus, the length of each edge (i.e., the weighting of the links) in a given pass is related to the amount of flow routed over the edge during the phase. At the next phase, the method tends to avoid routing over edges (links) having their lengths increased during the previous pass as a result of the shortest path computation's penalty of higher weighted edges. From step 409, the method returns to step 405 to route the next portion of the demand d(k).

If the test of step 402 determines that d>1, then a near optimal solution has been reached and the method advances to step 411. At step 411, the value of λ* is calculated, which may be employed to scale the demands, or inversely scale the edge capacities, of the network. First, the variable ρ is set to the maximum value of (f(e)/u(e)) for all e∈E. Next, the value of λ* is set as (c−1)/ρ. This normalization by (c−1) occurs because all the flows d(k) are routed on every phase, and c is decremented by 1 to account for incrementing c at the end of the previous phase.

Figure 5:
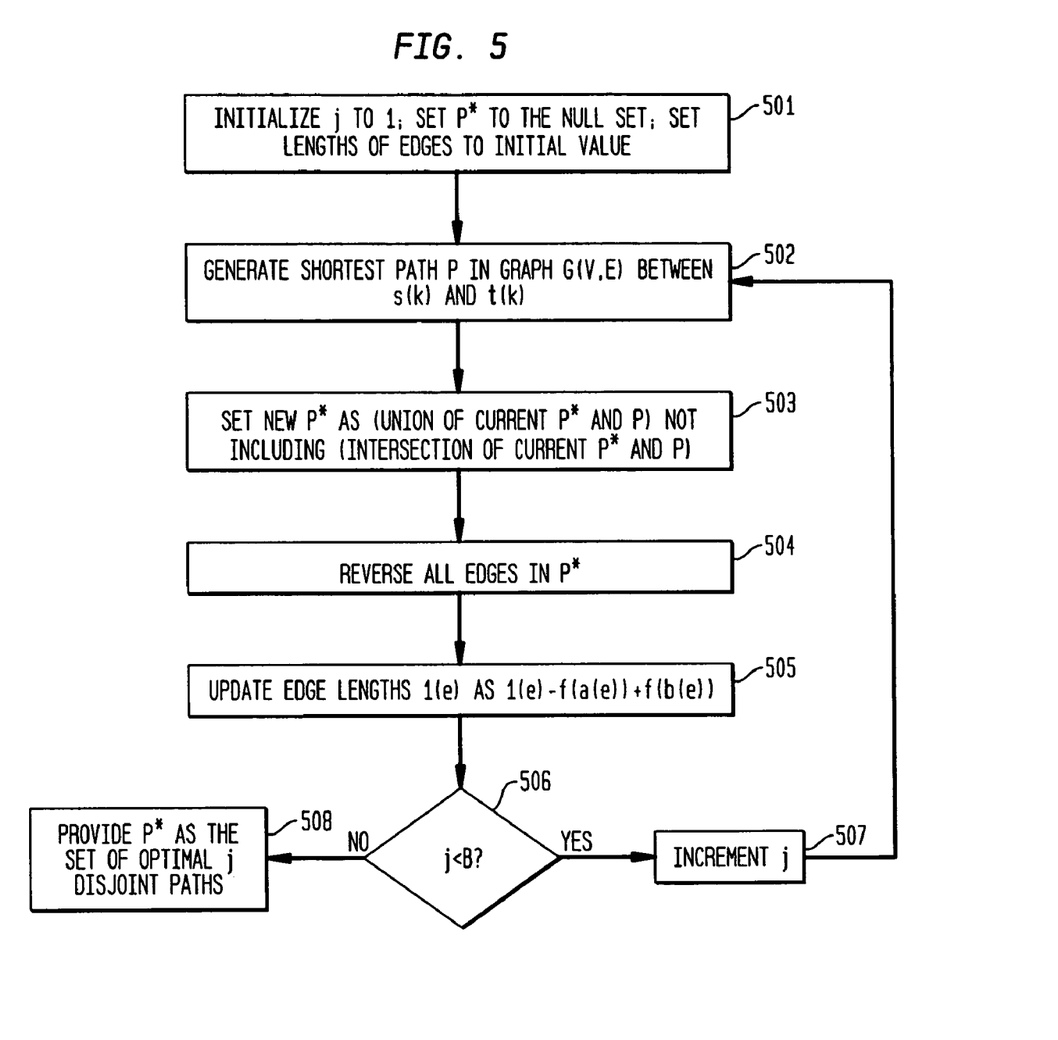
FIG. 5 shows an exemplary method of determining a set of minimum j disjoint paths between source and destination nodes as may be employed by the methods of FIGS. 4 and 6.

FIG. 5 shows an exemplary (routine) algorithm for determining a set P* of minimum j disjoint paths between node s(k) and t(k) as may be employed by step 408 of FIG. 4 with B=2. First, at step 501, the counter j is initialized to 1, the set P* of optimal j disjoint paths is initialized to the null set, and the lengths l(e) of edges are initialized to current values (which value may be provided to the routine). Next, at step 502, the shortest path P in graph G(V,E) from s(k) and t(k) is determined using, for example, the well-known Dijkstra's algorithm, such as described in E. Dijkstra, "*A Note: Two Problems In Connection With Graphs*," Numerical Mathematics, vol.1, 1959, pp.269-271.

At step 503, the optimal set P* of j disjoint paths is set to i) the union of the current set P* with the set P minus ii) the intersection of the current set P* with the set P. At step 504, all edges in the set P* are reversed. At step 505, the edge lengths l(e) are updated as l(e)−j(a(e))+j(b(e)), where j(i) is the shortest path distance label computed via, for example, Dijkstra's algorithm into node i, and a(e) and h(e) are the head node and tail node of link e. At step 506, a test determines whether j is less than B. If the test of step 506 determines that j is less than B, then, at step 507, j is incremented by 1 and the method returns to step 502. If the test of step 506 determines that j is not less than B (i.e., that j was incremented to B), the method advances to step 508. At step 508, the set P* is provided as the optimal set of j disjoint paths.

The value of ε may be a relatively small number appropriately selected arbitrarily depending on how "close" the ε-approximation solution should be relative to the exact solution. The ε-approximation solution is approximately (1+2ε) times the exact solution. The values of ε and δ may be related. For example, equation (7) gives an exemplary relation for ε and δ.

$$\delta = m^{-\frac{1}{\varepsilon}}(1-\varepsilon)^{\frac{1}{\varepsilon}}, \qquad (7)$$

where m is the number of links in the network. The running time of a particular implementation of the algorithm increases with the accuracy needed (i.e., the running time increases as ε decreases).

The following pseudo-code implements the method of FIG. 4 for the first exemplary embodiment of the present invention for capacity design of a network with NSB FPR connections.

```
100:    l(e) = δ/u(e)    ∀ e ∈ E    and    c = 0

101:    While d < 1
102:      For  k = 1,2,..., K
103:        r = d(k)
104:        While r > 0

105:          z = min_{P∈P_2^k} l(P)

106:          Let P* be the optimal path pair
```

-continued

107:     Let u = min$_{e \in P^*}$ u(e)

108:     $\Delta$ = min {r,u}

109:     r ← r − $\Delta$

110:     f(e) ← f(e) + $\Delta$

111:     l(e) ← l(e) $\left(1 + \dfrac{\varepsilon \Delta}{u(e)}\right)$   $\forall$ e $\in$ P*

112:     end While
113: end For

114:     c ← c + 1

115: end While

116:     $\rho = \max_{e \in E} \dfrac{f(e)}{u(e)}$

117:     $\lambda * = \dfrac{c-1}{\rho}$

A second exemplary embodiment of the present invention may be employed for routing of SB FPR connections. A solution for a network design that maximizes the FPR flows with backup sharing between nodes s and t may be decomposed into non-negative flows along path sets P∈P for j=2, 3, . . . , B. Each flow may be decomposed into sets of disjoint paths between s and t. Thus, the second exemplary embodiment forms a linear programming sizing problem that considers a set of B≧j≧2 disjoint paths between s(k) and t(k) for commodity k having a demand d(k), where each of the disjoint paths carries a flow of f units One of the j paths is the backup path while up to j−1 paths can carry the flow. Consequently, the total amount of FPR connection flow sent through the active path is (j−1)f units of flow.

The sizing problem for the second exemplary embodiment of SB FPR connections is formulated as a maximization of an objective function $\lambda$ subject to the constraints of equations (8), (9), and (10) as follows:

$\lambda$*=max $\lambda$ subject to:

$$\sum_{k}\sum_{j=2}^{B}\sum_{P \in P_j^k, e \in P} x(P) \leq u(e) \quad \forall e \in E, \tag{8}$$

$$\sum_{j=2}^{B}(j-1)\sum_{P \in P_j^k} x(P) = \lambda d(k) \; \forall \, k, \text{ and} \tag{9}$$

$x(P) \geq 0 \forall P \in P_j^k, \forall j, \forall k.$ (10)

The sizing problem of equations (8), (9), and (10) is similar to the sizing problem of the first exemplary embodiment given in equations (1), (2), and (3). However, the SB FPR connection sizing problem considers paths in set $P_j^k$ for B≧j≧2, rather than just j=2. A dual of the SB FPR connection problem may also be formed. The variable z(k) is the shortest path length between s(k) and t(k). The dual sizing problem is formulated as a minimization of z(k) as follows subject to the constraints of equations (11), (12), and (13):

$$\min \sum_{e \in K} u(e)l(e)$$

subject to:

$$\sum_{e \in P} l(e) \geq (j-1)z(k) \quad \forall \, P \in P_j^k; \quad \forall \, k, \tag{11}$$

$$\sum_{k=1}^{K} d(k)z(k) \geq 1, \tag{12}$$

$l(e) \geq 0 \forall e \in E,$ (13)

where, in an optimal solution to the dual sizing problem, the relation of equation (14) holds:

$$z(k) = \min_{j=2,3,\ldots,B} \min_{P \in P_j^k} \dfrac{l(P)}{(j-1)}. \tag{14}$$

Solution of the dual sizing problem for SB FPR connections might also employ an $\epsilon$-approximation algorithm operating in a manner similar to that described for the first exemplary embodiment, but with the following differences. First, instead of finding the shortest path pair to route the kth commodity flow, the shortest j disjoint paths are desirably determined for all values of j between 2 and B, and the kth commodity flow is routed on the shortest of these path sets. This shortest j disjoint path computation may be accomplished via the method shown and described with respect to FIG. 5. Second, once the flow is routed, the update of the edge lengths l(e) is modified to account for up to (j−1)f units of flow routed over the active path.

Figure 6:
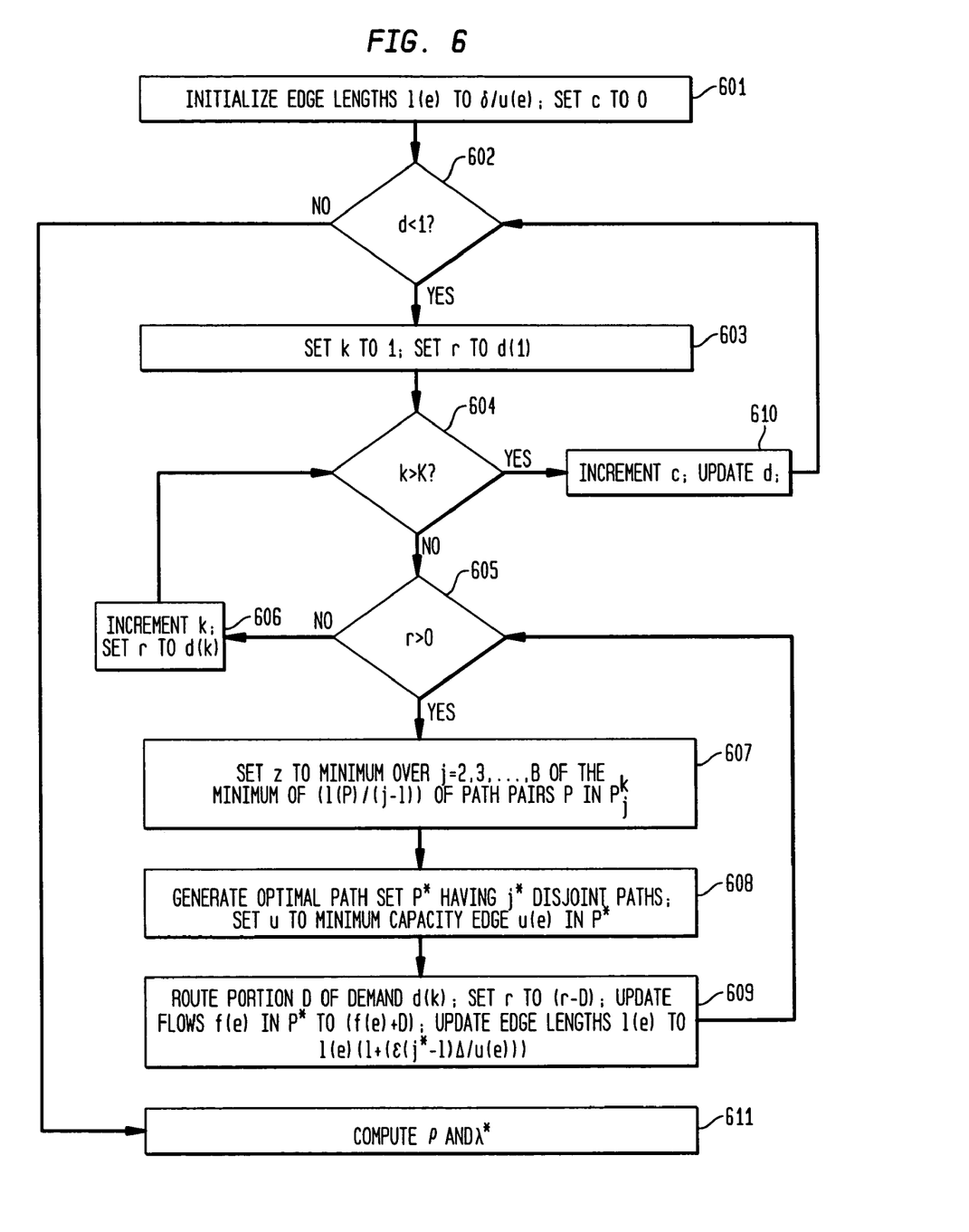
FIG. 6 shows an exemplary method of solving a dual sizing problem for shared backup FPR connections employing an approximation algorithm.

FIG. 6 shows an exemplary method of solving the dual sizing problem for SB FPR connections employing an approximation algorithm. At step 601, an associated length l(e) of each edge e is initialized with an initial weight of $$\dfrac{\delta}{u(e)}.$$

The value of $\delta$ is related to $\epsilon$, as described previously, and u(e) is the total capacity (not residual capacity) of edge e. Also, at step 601, the counter value c is set to 0. As the method progresses, c is updated to count the number of phases completed by the method.

At step 602, a test determines whether d is less than 1. The variable d is set and the test of step 602 determines whether, after the previous phase has completed, the current solution of the $\epsilon$-approximation meets a predefined criterion for a near optimal solution to the dual sizing problem. If the test of step 602 determines that d>1, then the method advances to step 611, where the process of computing final output values begins. If the test of step 602 determines that d≧1, then another phase (c+1) is desired and the method advances to step 603.

At step 603, the value of k is set to 1, and flow variable r is set to the first commodity's demand d(1). At step 604 the method checks whether k>K, indicating that all K commodities have been routed for the current phase (c). If the test of step 604 determines that k>K, then the method advances to step 610. At step 610, the counter value c is incremented by 1, d is updated, and the method returns to step 602. If the test of step 604 determines that k≦K, then the method advances to step 605.

At step 605, a test determines whether r>0. If the test of step 605 determines that r is less than or equal to 0, the current demand d(k) has been routed, and the method advances to step 606. At step 606, k is incremented by 1 to point to the next commodity, r is set to next commodity's demand, and the method returns to step 604 to route the next commodity's demand. If the test of step 605 determines that r>0, then not all of the current commodity's demand has been routed, and the method advances to step 607.

At step 607, the minimum length variable z is set to the minimum over j=2, 3, . . . , B of the minimum of (l(P)/(j−1)) of the path pairs P in $P_j^k$, where the path length l(P) is defined as the sum of the lengths of the edges in the path pair P. At step 608, the optimal path set P* is generated for this length z, such as by the method described above with respect to FIG. 5, and the optimal path set P* has j* disjoint paths in the set. The minimum capacity edge variable u is set as the capacity of the edge in P* having the least value (i.e., min u(e), where e∈P*).

At step 609, a portion Δ of the demand d(k) is routed. The portion Δ is set as the minimum value between (r/(j*−1)) and u. The variable r is updated to (r−Δ), the flows on the edges in P* that carry the flows are updated (i.e., f(e) gets f(e)+Δ), and the lengths of the edges that carry the flow are updated. In step 609, the ε-approximation updates the lengths l(e), e∈P*, as l(e)(1+(ε(j*−1)Δ/u(e)). Thus, the length of each edge (i.e., the weighting of the links) in a given phase is related to the amount of flow routed over the edge during the phase. At the next phase, the method tends to avoid routing over links having their lengths increased during the previous phase as a result of the shortest path computation. From step 609, the method returns to step 605 to route the next portion of the demand d(k).

If the test of step 602 determines that d>1, then a near optimal solution has been reached and the method advances to step 611. At step 611, the value of λ* is calculated which is employed to scale the demands, or inversely scale the edge capacities, of the network. First, the variable ρ is set to the maximum value of (f(e)/u(e)) for all e∈E. Next, the value of λ* is set as (c−1)/ρ. This normalization by (c−1) occurs because all the flows d(k) are routed on every phase, and c is decremented by 1 to account for incrementing c at the end of the previous phase.

The following pseudo-code implements the method of FIG. 6 for the second exemplary embodiment of the present invention for capacity design of a network with SB FPR connections.

100: $l(e) = \dfrac{\delta}{u(e)}$  ∀ e ∈ E  and  c = 0
101: While d < 1
102:   For  k = 1,2,..., K
103:     r = d(k)
104:     While r > 0

-continued

105: $z = \min_{j=2,3,\ldots,B} \min_{P \in P_j^k} \dfrac{l(P)}{j-1}$

106: Let P* be the optimal path set with j* disjoint paths

107: Let u = $\min_{e \in P^*} u(e)$

108: $\Delta = \min\left\{\dfrac{r}{j*-1}, u\right\}$

109: r ← r − Δ

110: f(e) ← f(e) + Δ

111: $l(e) \leftarrow l(e)\left(1 + \dfrac{\varepsilon(j*-1)\Delta}{u(e)}\right)$  ∀ e ∈ P*

112:     end While
113:   end For

114: c ← c + 1

115: end While

116: $\rho = \max_{e \in E} \dfrac{f(e)}{u(e)}$

117: $\lambda * = \dfrac{c-1}{\rho}$

While the present invention has been described for network capacity design of restorable connections with connections protected against single link failures, the present invention may be extended to network capacity design of restorable connections with connections protected against single node failures. For connections protected against single node failures, the network graph G(V,E) is modified as follows. Each node having input and output edges (links) is replaced by two nodes coupled by a single link. The first node is coupled to the input edges and the second node is coupled to the output edges.

While the exemplary embodiments of the present invention are described with respect to various equations, the present invention is not limited to the form of these equations. One skilled in the art may modify these equations by scaling, or may form different approximate solutions to the linear programming problems described herein employing any of a number of techniques well known in the art.

The present invention may be embodied in a processor, such as a network controller or computer, and the processor may be coupled to a network or network database to receive network topology, provisioning, and capacity information used by the methods as described herein.

Network capacity design in accordance with one or more embodiments of the present invention may provide for the advantages of more efficient utilization of network service level capacity, reducing congestion of optical switches at network nodes, and higher data throughput of the network.

As would be apparent to one skilled in the art, the various functions of capacity design for restorable connections may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of allocating demands of a plurality of restorable connections transferring data through a network of nodes connected by links, the method comprising the steps of:
    (a) initializing a link length of each link;
    (b) routing a demand for a current restorable connection by the steps of:
        (b1) generating a minimum path length for paths through nodes and links of the network for the current restorable connection, wherein the minimum path length is the least sum of link lengths for links of each path between a source and a destination node of the current restorable connection,
        (b2) determining a path set of disjoint paths through nodes and links of the network for the current restorable connection based on the minimum path length,
        (b3) routing a portion of a remainder of the demand as flows over the path set, wherein the portion is based on a lesser value of the remainder of the demand and a minimum capacity of links in the optimal path set,
        (b4) updating i) the link length of each link based on the routed portion and a capacity of the link and ii) the remainder of the demand, and
        (b5) repeating steps (b1)-(b5) until the demand is routed;
    (d) repeating step (b) for each restorable connection;
    (e) generating a scaling value based on a maximum ratio of a flow over a link and a capacity of the link.

2. The invention of claim 1, further comprising the step of routing each restorable connection based on the path set.

3. The invention of claim 1, further comprising the steps of generating a metric for the updated link lengths and repeating steps (b) through (d) based on the metric.

4. The invention of claim 1, further comprising the step of scaling, based on the scaling factor, either i) each capacity of the plurality of links or ii) each demand of the plurality of restorable connections.

5. The invention of claim 1, wherein, for step (b), each restorable connections is a fast path restorable connection.

6. The invention of claim 5, wherein, for step (b) each restorable connection is a fast path restorable connection with non-shared backup, and wherein:
    the shortest path length is determined for a set of disjoint path pairs corresponding to each restorable connection.

7. The invention of claim 5, wherein, for step (b), each restorable connection is a fast path restorable connection with shared backup, and wherein:
    the shortest path length is determined for a set of disjoint path sets corresponding to each restorable connection.

8. The invention of claim 1, wherein the method generates an $\epsilon$-approximation based on a constant $\epsilon$, for step (b4), the link length is updated based on a combination of $\epsilon$ and the portion.

9. The invention of claim 1, wherein, for step (a), the network is an optical network, each node is an optical switch, and each link is an optical link.

10. The invention of claim 1, wherein the method is implemented as steps executed by a processor.

11. A method of allocating link capacity for a plurality of restorable connections transferring data through a network, the method comprising the steps of:
    (a) generating a graph of the network, wherein the network includes a plurality of nodes interconnected by a plurality of links;
    (b) forming a linear programming sizing problem based on the plurality of restorable connections, wherein i) each restorable connection defines a primary and a backup path for a demand and ii) the linear programming sizing problem tends to maximize a first objective function based on a first set of constraints;
    (c) forming a dual of the linear programming sizing problem, wherein the dual tends to minimize a second objective function based on a second set of constraints;
    (d) solving the dual to generate a scaling factor and routing of the primary path and the backup path for each of the plurality of restorable connections; and
    (e) routing data of at least one of the plurality of restorable connections over a corresponding active path.

12. The invention of claim 11, further comprising the step of scaling, based on the scaling factor, either i) each capacity of the plurality of links or ii) each demand of the plurality of restorable connections.

13. The invention of claim 11, wherein, for step (b), the plurality of restorable connections are fast path restorable connections, and wherein:
    the linear programming sizing problem maximizes the scaling factor as the objective function;
    the first set of constraints are A) a sum of all flows on each link is less than the link's capacity, B) each demand as a function of the scaling factor is routed through the network, and C) each flow over a link is non-negative;
    the dual minimizes a shortest path length through for each of the plurality of restorable connections;
    the second set of constraints are D) a sum of all link lengths is less than the minimum shortest path length, E) each demand as a function of the minimum path length is routed through the network, and F) each link length is non-negative.

14. The invention of claim 13, wherein, for step (b) each restorable connection is a fast path restorable connection with non-shared backup, and wherein the shortest path length is determined for a set of disjoint path pairs corresponding to each restorable connection.

15. The invention of claim 13, wherein, for step (b), each restorable connection is a fast path restorable connection with shared backup, and wherein the shortest path length is determined for a set of disjoint path sets corresponding to each restorable connection.

16. The invention of claim 11, wherein, for step (a), the network is an optical network, each node is an optical switch, and each link is an optical link.

17. A computer-readable medium having stored thereon a plurality of instructions, the plurality of instructions including instructions which, when executed by a processor, cause the processor to implement a method for allocating demands of a plurality of restorable connections transferring data through a network of nodes connected by links, the method comprising the steps of:
(a) initializing a link length of each link;
(b) routing a demand for a current restorable connection by the steps of:
   (b1) generating a minimum path length for paths through nodes and links of the network for the current restorable connection, wherein the minimum path length is the least sum of link lengths for links of each path between a source and a destination node of the current restorable connection,
   (b2) determining a path set of disjoint paths through nodes and links of the network for the current restorable connection based on the minimum path length,
   (b3) routing a portion of a remainder of the demand as flows over the path set, wherein the portion is based on a lesser value of the remainder of the demand and a minimum capacity of links in the optimal path set,
   (b4) updating i) the link length of each link based on the routed portion and a capacity of the link and ii) the remainder of the demand, and
   (b5) repeating steps (b1)-(b5) until the demand is routed;
(d) repeating step (b) for each restorable connection;
(e) generating a scaling value based on a maximum ratio of a flow over a link and a capacity of the link.

18. A computer-readable medium having stored thereon a plurality of instructions, the plurality of instructions including instructions which, when executed by a processor, cause the processor to implement a method for allocating link capacity through a network having a plurality of nodes interconnected by a plurality of links, the method comprising the steps of:
(a) generating a graph of the network, wherein the network includes a plurality of nodes interconnected by a plurality of links;
(b) forming a linear programming sizing problem based on the plurality of restorable connections, wherein i) each restorable connection defines a primary and a backup path for a demand and ii) the linear programming sizing problem tends to maximize a first objective function based on a first set of constraints;
(c) forming a dual of the linear programming sizing problem, wherein the dual tends to minimize a second objective function based on a second set of constraints;
(d) solving the dual to generate a scaling factor and routing of the primary path and the backup path for each of the plurality of restorable; and
(e) routing data of at least one of the plurality of restorable connections over a corresponding active path.

* * * * *